US010860797B2

(12) United States Patent
Mahmoud

(10) Patent No.: US 10,860,797 B2
(45) Date of Patent: *Dec. 8, 2020

(54) GENERATING SUMMARIES AND INSIGHTS FROM MEETING RECORDINGS

(71) Applicant: Cisco Technology, Inc., San Jose, CA (US)

(72) Inventor: Mohamed Gamal Mohamed Mahmoud, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 275 days.

This patent is subject to a terminal disclaimer.

(21) Appl. No.: 16/007,895

(22) Filed: Jun. 13, 2018

(65) Prior Publication Data

US 2019/0384813 A1    Dec. 19, 2019

(51) Int. Cl.
| | |
|---|---|
| *G10L 15/08* | (2006.01) |
| *G06F 40/289* | (2020.01) |
| *G06F 40/30* | (2020.01) |
| *G10L 15/26* | (2006.01) |
| *H04L 29/06* | (2006.01) |
| *G10L 15/32* | (2013.01) |

(52) U.S. Cl.
CPC ............ *G06F 40/289* (2020.01); *G06F 40/30* (2020.01); *G10L 15/08* (2013.01); *G10L 15/26* (2013.01); *G10L 15/32* (2013.01); *G10L 2015/081* (2013.01); *G10L 2015/088* (2013.01); *H04L 65/403* (2013.01)

(58) Field of Classification Search
None
See application file for complete search history.

(56) References Cited

U.S. PATENT DOCUMENTS

| | | | | | |
|---|---|---|---|---|---|
| 5,572,728 | A | * | 11/1996 | Tada | G11B 27/031 |
| 6,493,663 | B1 | * | 12/2002 | Ueda | G06F 40/35 |
| | | | | | 704/9 |
| 8,489,600 | B2 | * | 7/2013 | Hannuksela | G11B 27/034 |
| | | | | | 707/736 |
| 8,886,732 | B2 | * | 11/2014 | Avitabile | G06Q 10/109 |
| | | | | | 709/206 |
| 9,158,811 | B1 | * | 10/2015 | Choudhary | H04L 41/5032 |
| 10,579,685 | B2 | * | 3/2020 | Hill | G06F 16/29 |
| 2004/0109674 | A1 | * | 6/2004 | Ohmori | H04N 5/775 |
| | | | | | 386/253 |
| 2007/0143110 | A1 | * | 6/2007 | Acero | G10L 15/05 |
| | | | | | 704/251 |
| 2017/0242913 | A1 | * | 8/2017 | Tijssen | G06F 40/289 |

(Continued)

*Primary Examiner* — Neeraj Sharma
(74) *Attorney, Agent, or Firm* — Merchant & Gould P.C.

(57) ABSTRACT

One embodiment of the present invention sets forth a technique for generating a summary of a recording. The technique includes generating an index associated with the recording, wherein the index identifies a set of terms included in the recording and, for each term in the set of terms, a corresponding location of the term in the recording. The technique also includes determining categories of predefined terms to be identified in the index and identifying a first subset of the terms in the index that match a first portion of the predefined terms in the categories. The technique further includes outputting a summary of the recording comprising the locations of the first subset of terms in the recording and listings of the first subset of terms under one or more corresponding categories.

14 Claims, 8 Drawing Sheets

(56) References Cited

U.S. PATENT DOCUMENTS

2018/0233174 A1* 8/2018 Nakagawa ............. G11B 27/34
2019/0147383 A1* 5/2019 Jaroch .................. G06Q 10/109
　　　　　　　　　　　　　　　　　　　　　　705/7.39
2019/0273767 A1* 9/2019 Nelson .................. H04L 65/403

* cited by examiner

GENERATING SUMMARIES AND INSIGHTS FROM MEETING RECORDINGS

BACKGROUND

Field of the Various Embodiments

Embodiments of the present invention relate generally to text and speech analytics, and more particularly, to generating summaries and insights from meeting recordings.

Description of the Related Art

Recent technological advances have allowed meetings to be conducted more efficiently and effectively. For example, network-enabled devices have been deployed with solutions that allow people to conduct teleconferences with one another instead of requiring all participants to be in the same physical location. The solutions may also allow the participants to record video and/or audio during meetings, generate transcripts from meeting recordings, share notes and minutes with one another, find meeting times that work best for most or all participants, and/or interact or collaborate within a virtual or augmented environment.

However, insights and/or conclusions continue to be generated or derived from meetings on a manual basis. For example, an attendee may take notes during a meeting to identify and/or track important points, discussions, and/or decisions in the meeting. In another example, a user may be required to review an entire recording and/or transcript of a meeting to determine the content of the meeting.

As the foregoing illustrates, what is needed is a technological improvement for automating or streamlining the generation of insights, key points, topics, and/or summaries for meetings.

SUMMARY

One embodiment of the present invention sets forth a technique for generating a summary of a recording. The technique includes generating an index associated with the recording, wherein the index identifies a set of terms included in the recording and, for each term in the set of terms, a corresponding location of the term in the recording, creating, based on the index, a timeline of the set of terms in the recording, wherein the timeline identifies contiguous frames in the recording and groupings of locations of the set of terms within the contiguous frames in the recording, identifying a subset of the contiguous frames in the timeline that include a phrase comprising a series of words, and generating a summary of the recording that includes the phrase.

At least one advantage of the disclosed techniques is that the summary expedites the review of meetings or other events and/or the use of content discussed during the events. For example, a user may analyze the summary of a meeting to identify key points, topics, decisions, and/or participants in the meeting; determine the effectiveness of the meeting in covering the agenda and/or the ability of the participants to collaborate during the meeting; and/or identify actions that can be taken as result of the meeting. Consequently, the disclosed techniques provide technological improvements in interactive virtual meeting assistants and/or other applications or devices that are used to conduct, manage, schedule, and/or review meetings or other types of events.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
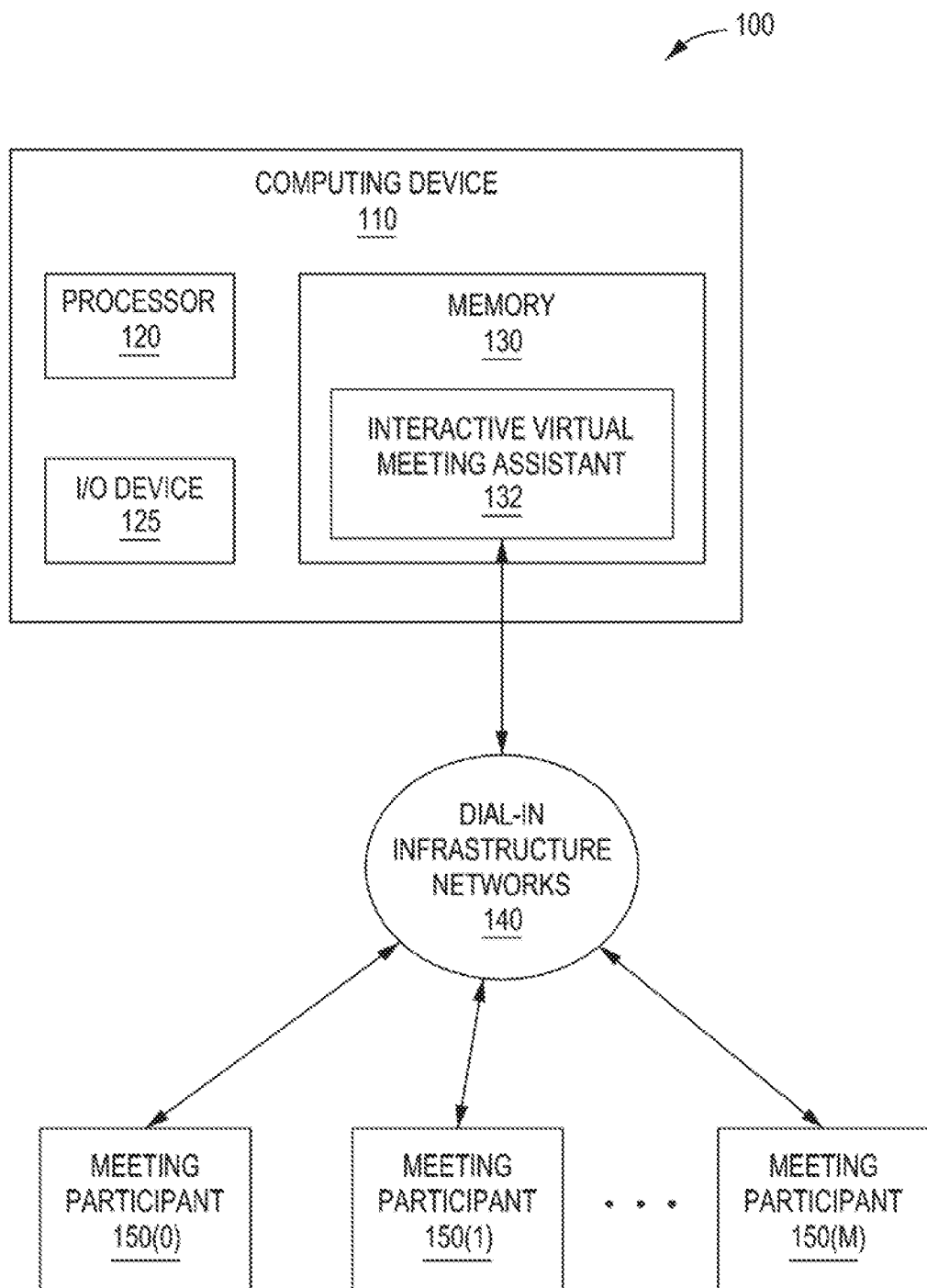
FIG. 1 is a block diagram illustrating a system configured to implement one or more aspects of the present disclosure.

FIG. 1 illustrates a system 100 configured to implement one or more aspects of the present disclosure. As shown, system 100 includes, without limitation, a computing device 110 coupled via dial-in infrastructure networks 140 to multiple meeting participants 150(0) to 150(m).

As shown, computing device 110 includes, without limitation, a processor 120, input/output (I/O) devices 125, and a memory 130. Processor 120 may be any technically feasible form of processing device configured to process data and execute program code. Processor 120 could be, for example, a central processing unit (CPU), a graphics processing unit (GPU), an application-specific integrated circuit (ASIC), a field-programmable gate array (FPGA), and so forth. I/O devices 125 may include devices configured to receive input or provide output, including, for example, a keyboard, a mouse, a display, and so forth.

Memory 130 may be any technically feasible storage medium configured to store data and software applications. Memory 130 may be, for example, a hard disk, a random-access memory (RAM) module, a read-only memory (ROM), and so forth. As also shown, memory 130 includes, without limitation, an interactive virtual meeting assistant 132, which is a software application that, when executed by processor 120, causes processor 120 to execute an interactive virtual meeting assistant application. Interactive virtual meeting assistant 132 may include any technically feasible type of virtual meeting assistant, such as the EVA application from VOICERA, INC.

Dial-in infrastructure networks 140 may be any technically feasible network or set of interconnected communication links that enable interactive virtual meeting assistant 132, as executed by processor 120, to participate in a meeting with one or more meeting participants 150(0) to 150(m). In various embodiments, dial-in infrastructure networks 140 may include, without limitation, one or more telephone line connections or one or more computer connections, such as a local area network (LAN), wide area network (WAN), the World Wide Web, or the Internet, among others. Dial-in infrastructure networks 140 may also allow interactive virtual meeting assistant 132 to access other information via the networks, such as by accessing information via the World Wide Web, or the Internet, among others.

Meeting participants 150(0) to 150(m) represent one or more human and/or computer participants in a meeting environment. Each of meeting participants 150(0) to 150(m) may be connected to other meeting participants and interactive virtual meeting assistant 132, as executed by processor 120, via any technically feasible device that forms a connection to other meeting participants, such as a telephone, smartphone, computing device, or personal data assistant, among others. The connections linking meeting participants 150(0) to 150(m) may be any technically feasible communication link(s), including, without limitation, communication links in dial-in infrastructure networks 140 and/or external communication links such as telephone line connections and/or network connections to a local area network (LAN), wide area network (WAN), the World Wide Web, or the Internet, among others.

Although FIG. 1 shows interactive virtual meeting assistant 132 stored in memory 130 of computing device 110, in alternative embodiments, interactive virtual meeting assistant 132 may be stored in part or entirely in memory 130 and/or on any technically feasible memory device internal to or external to computing device 110, including any memory device coupled to computing device 110 through a wired connection, a wireless connection, a network connection, and so forth.

Interactive virtual meeting assistant 132 includes functionality to generate, track, and/or store metadata and recordings related to a meeting. For example, interactive virtual meeting assistant 132 may obtain a title, location (e.g., physical address, building number, conference room name, teleconferencing link, phone number, etc.), description, agenda, time, duration, list of participants, inviter or organizer, and/or other information describing the meeting from a calendar invitation, email, text message, chat message, voicemail, phone call, and/or other communication related to the meeting. Interactive virtual meeting assistant 132 may also, or instead, capture audio and/or video of the meeting and/or record notes or action items generated during the meeting. Interactive virtual meeting assistant 132 may further record "highlights" that are flagged by one or more meeting participants 150(0) to 150(m) as important. A meeting participant may activate recording of a highlight by issuing a voice command and/or other type of input to interactive virtual meeting assistant 132.

As described in further detail below, interactive virtual meeting assistant 132 may use the metadata and recordings to generate summaries and insights related to the meeting. Such summaries and insights may include, but are not limited to, categories of important words and phrases in the meeting, locations of the words and phrases in a recording of the meeting, sentences including the words and phrases, speakers of the words and phrases, and/or other context related to the words and phrases; measures of attributes such as inquisitiveness, quantitativeness, and/or sentiment in the meeting; and/or topics, themes, notable mentions, and/or entities that appear in the recording. The summaries and insights may then be displayed within a user interface to allow users to determine, without manually reviewing the meeting recording or transcript, the content and context of the meeting; important points, discussions, and/or decisions in the meeting; and/or the effectiveness or tone of the meeting.

Generating Summaries and Insights from Meeting Recordings

Figure 2:
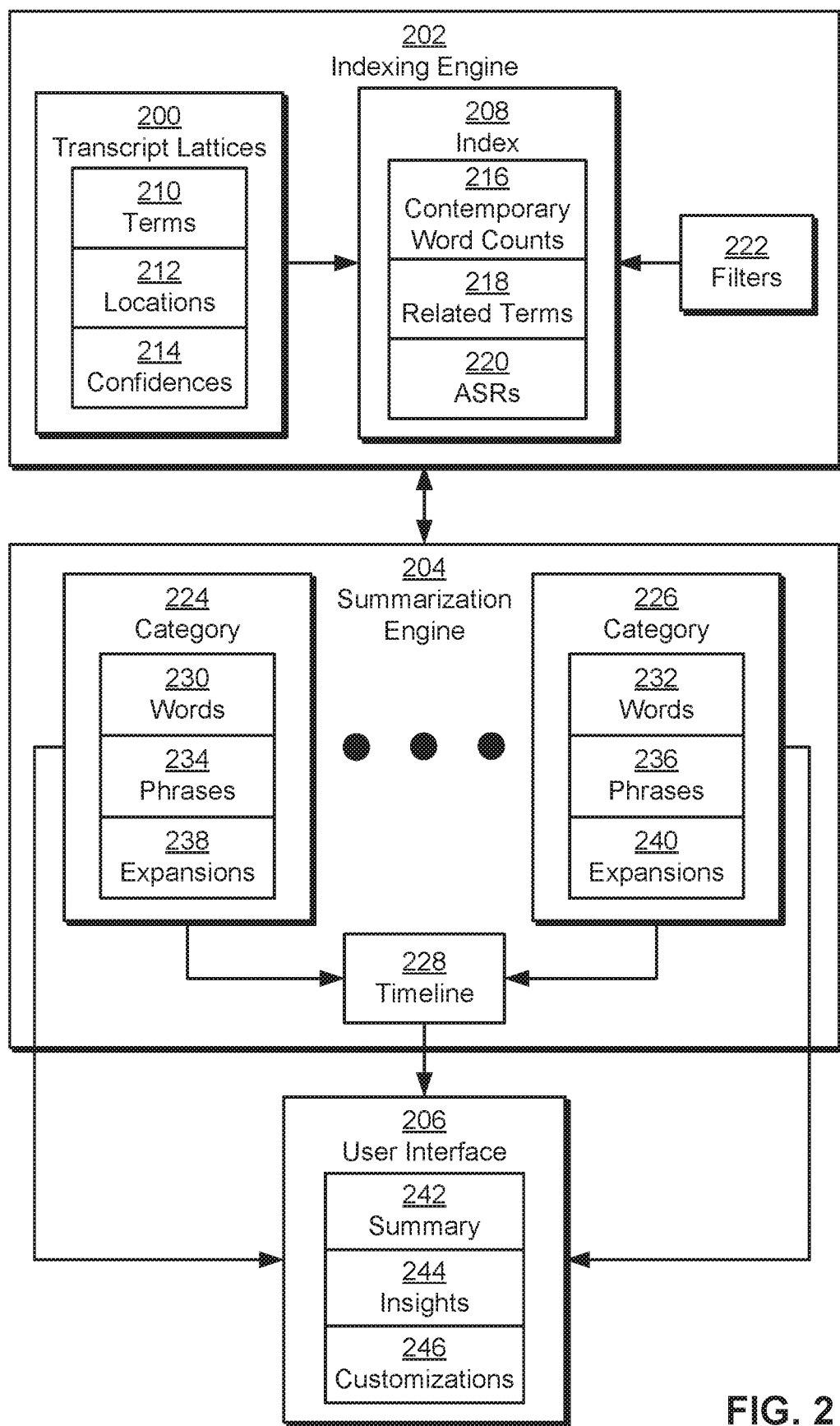
FIG. 2 is a more detailed illustration of functionality provided by the interactive virtual meeting assistant of FIG. 1, according to various embodiments of the present invention.

FIG. 2 is a more detailed illustration of functionality provided by interactive virtual meeting assistant 132 of FIG. 1, according to various embodiments of the present invention. As shown, the functionality may be provided by an indexing engine 202 and a summarization engine 204, which can be implemented as part of and/or separately from interactive virtual meeting assistant 132. Each of these components is described in further detail below.

Indexing engine 202 may generate an index 208 from one or more transcript lattices 200, which in turn are generated from a recording of a meeting (or any other type of activity or event). Prior to producing index 208, indexing engine 202 and/or another component may produce transcript lattices 200 from the recording. For example, the component may use multiple automatic speech recognition (ASR) engines or techniques to generate a number of different transcript lattices 200 from the recording. Each transcript lattice includes a set of terms 210, locations 212 of terms 210 in the recording, and confidences 214 in terms 210.

Terms 210 may include words, phrases, morphemes, n-grams, syllables, phonemes, and/or other representations of speech or text that is extracted from the recording. When ASR techniques are used to generate non-word terms 210 (e.g., morphemes, phonemes, syllables, etc.) from the recording, the non-word terms may be converted into words. The words may then be included in the corresponding transcript lattices 200, in lieu of or in addition to the non-word terms used to produce the words.

Locations 212 may represent the positions of terms 210 in the recording. For example, each location may specify a start and end timestamp for each term, a start timestamp and a duration for each term, and/or another representation of the portion of the recording occupied by the term.

Confidences 214 may include measures of predictive accuracy in terms 210 generated by the ASR techniques from the recording. For example, each confidence may be represented by a value with a range of 0 to 1, which represents the probability that a word predicted by the corresponding ASR engine exists at the corresponding location.

Transcript lattices 200 are converted into and/or represented using time-marked conversation (ctm) files. Each CTM file may include a series of lines, with each line representing a possible transcription of a time-marked interval. For example, a line in a CTM file may adhere to the following format:

<start offset><duration><word><confidence>

In turn, an example CTM file may include the following lines:

4.16 0.41 hi 1.00
4.66 0.14 the 0.55
4.65 0.42 there 0.69
. . . .

The first line includes a start offset of 4.16 seconds, a duration of 0.41 seconds, a word of "hi," and a confidence of 1.00. The second line includes a start offset of 4.66 seconds, a duration of 0.14 seconds, a word of "the," and a confidence of 0.55. The third line includes a start offset of 4.65 seconds, a duration of 0.42 seconds, a word of "there," and a confidence of 0.69. Because the second and third lines include overlapping time intervals, the corresponding words of "the" and "there" may be contemporary words (i.e., words that occur at the same time in the recording).

Indexing engine 202 may populate index 208 with terms 210, locations 212, and confidences 214 from one or more transcript lattices 200. Indexing engine 202 may further add contemporary word counts 216, related terms 216, and ASRs 220 associated with terms 210 to index 208.

Contemporary word counts 216 may specify the number of contemporary words that occur within a given time interval. For example, two words of "in" and "indeed" may be found in a time interval between 4.6 and 4.9 seconds in the recording, resulting in a contemporary word count of 2 for that interval.

Related terms 218 may include synonyms and/or semantically similar terms for a given term. For example, related terms 218 for each term in transcript lattices 200 may be generated using a latent semantic analysis (LSA) technique, word2vec technique, and/or another technique for identifying semantic relationships among words. A threshold may then be applied to word embeddings outputted by the technique to produce related terms 218 as words that are within a certain semantic similarity or distance from a given word in index 208, which may be estimated by defining a topological similarity using ontologies to define the distance between terms 210 and related terms 218.

ASRs 220 may identify one or more ASR techniques used to generate each term in index 208. For example, ASRs 220 may include names and/or other unique identifiers for ASR engines used to produce transcript lattices 200. In turn, index 208 may identify, for each location of a term, one or more ASRs 220 that predicted the term at that location.

In one or more embodiments, index 208 includes an inverted index that identifies, for each unique term in transcript lattices 200, a list of related terms 216, locations 212 of the term in the recording, a confidence in each location of the term, one or more ASRs 220 used to produce the term at each location, and a contemporary word count 216 at each location. For example, index 208 may include the following representation:

```
{
    "hi": {
        "relatedTerms": ["hello", "hey"],
        "locations": [{
            "start": 4.16,
            "end": 4.57,
            "confidence": 1.00,
            "asr": "A",
            "contemporaryCount": 4
        }, {
            "start": 1.09,
            "end": 1.46,
            "confidence": 0.89,
            "asr": "B",
            "contemporaryCount": 6
        }]
    },
    ...
}
```

The above representation includes an entry for the word of "hi." The entry includes related terms of "hello" and "hey," followed by a list of "locations" (e.g., locations 212) of the word in the recording. Each location is represented by a "start" and "end" timestamp, a "confidence" in the word at that location, an "asr" used to produce the location and a "contemporaryCount" indicating the number of co-occurring words within the word's start and end timestamps.

To improve the accuracy of index 208, indexing engine 202 may apply a number of filters 222 to components of index 208. For example, indexing engine 202 may use a minimum confidence threshold to remove locations 212 with low confidences 214 from index 208. In another example, indexing engine 202 may apply a maximum contemporary word count threshold to remove locations 212 with high contemporary word counts from index 208. In a third example, indexing engine 202 may apply a minimum ASR count threshold to ensure that consensus is reached by a minimum number of ASR engines in predicting terms 210 at locations 212. In a fourth example, indexing engine 202 may remove locations 212 with durations of terms 210 that are too short or too long for the corresponding language. In a fifth example, indexing engine 202 may apply a blacklist of profane or otherwise restricted words to index 208. In a sixth example, indexing engine 202 may remove stop words and/or high-frequency words from index 208. In a seventh example, indexing engine 202 may limit terms 210 in index 208 to certain parts of speech and/or word forms. In an eighth example, indexing engine 202 may group related terms 218 in index 208 after performing stemming, semantic analysis, and/or lemmatization of terms 210.

Summarization engine 204 may use index 208 to generate a summary 242 of the meeting. As illustrated in FIG. 2, summary 242 may be created based on a number of categories 224-226, as well as words 230-232, phrases 234-236, and expansions 238-240 that are listed or defined under categories 224-226 and/or determined to be relevant to categories 224-226.

Categories 224-226 may describe classes of words 230-232 and phrases 234-236 that can potentially be found in index 208. For example, categories 224 may include topics, concepts, and/or themes that are interesting or relevant to participants and/or a moderator of a meeting. In turn, categories 224 may be populated with words 230-232 and phrases 234-236 that represent or are related to the corresponding topics, concepts, and/or themes.

In one or more embodiments, categories 224-226 include curated categories, dynamic categories, and/or user-defined categories. Curated categories may include standard, statically defined categories that are created by a product team associated with interactive virtual meeting assistant 132 and/or other components involved in processing recordings of meetings and/or other events. For example, curated categories for meetings may include, but are not limited to, questions, action items, dates and times, requests, sales, sales processes, introductions, business jargon, numbers, locations, commitments, strong reactions, and/or idioms and sayings. Words and phrases that can be found under the "locations" category may include, but are not limited to, cities, counties, states, countries, regions, bodies of water, mountains, and/or other geographic locations. Words and phrases that can be found under the "questions" category may include, but are not limited to, "what about," "do you know," "will you," "what are," "where are," "why do," "what do," "where do," "how do," "can you," "could you," "what is," "where is," "how are," and/or "how will." Words and phrases that can be found under the "dates and times" category may include, but are not limited to, days, months, weeks, years, times, time intervals, and/or other representations of dates and times.

Dynamic categories may include categories that are generated based on metadata and/or other information describing the meeting. For example, the dynamic categories may represent and/or be generated from the meeting's agenda, summary, description, schedule, location, list of participants, inviter or organizer, highlights, and/or related meetings (e.g., previous meetings in a series of meetings with the same topic, summary, and/or agenda). In turn, the dynamic categories may be populated with words and phrases from the corresponding metadata. Continuing with the above example, the "agenda" category may include words and phrases from the meeting's agenda; the "list of participants" category may include names, titles, descriptions, employers, email addresses, and/or other personal information for the meeting's attendees; and the "schedule" category may include the date, time and/or duration of the meeting.

User-defined categories may include categories that are added by users that are interested in reviewing a meeting or event. For example, the user-defined categories may represent topics that are of interest to a particular attendee and/or the organizer of a meeting. In another example, user-defined categories may include a category of words a user would like to be identified in the meeting and/or a category of words the user would like to avoid being identified in the meeting. After a user-defined category is created, a user may add words and phrases to the category for subsequent use in generating summary 242 from index 208.

Categories 224-226 may be defined according to an order of precedence, such that words and phrases in a higher precedence category are not repeated in a lower precedence one. For example, a curated "requests" category may have higher precedence than a curated "questions" category. As a result, a phrase of "could you please" may be included in the "requests" category and omitted from and/or ignored in the "questions" category.

A user may interact with a user interface 206 to provide customizations 246 related to including, excluding, and/or defining categories 224-226 that should be matched to terms 210 and/or related terms 218. For example, user interface 206 may include a graphical user interface (GUI), command line interface (CLI), voice user interface (e.g., with interactive virtual meeting assistant 132), and/or other type of interface between a human and an electronic device. The user may include an organizer or inviter of the meeting, an attendee of the meeting, a user that is interested in the content or discussion of the meeting, and/or a user that is responsible for managing the generation of summary 242 and insights 244 from the meeting. Within user interface 206, the user may enable or disable predefined categories, add or remove user-defined categories for a given meeting or corresponding index 208, change the order of precedence of the categories, add or remove words and/or phrases associated with a given category, and/or specify whether a category is a whitelist of terms 218 to include in summary 242 or a blacklist of terms 218 to exclude from summary 242.

After categories 224-226 are defined and/or selected for a given meeting, summarization engine 204 may match terms 210 and/or related terms 218 in index 208 to words 230-232 and phrases 234-236 included in and/or defined under categories 224-226. When a given term or a related term matches a word or phrase listed under a category, summarization engine 204 may include the word or phrase under the category in summary 242. For example, summarization engine 204 may include and/or execute a number of "scanners" that scan index 208 for terms 218 that match words 230-232 and phrases 234-236 in the selected categories 224-226. Each scanner may generate a "vote" for each term in summary 242. When a scanner votes "yes," the corresponding term is included in summary 242. When a scanner votes "no," the corresponding term is excluded from summary 242. When a scanner abstains from voting, other scanners may be used to decide if the term is to be included in summary 242 or excluded from summary 242.

Scanners employed by summarization engine 204 may be applied according to a configurable order of precedence. For example, a blacklist scanner that only votes "no" or abstains from voting may have higher precedence than one or more whitelist scanners that vote "yes" or abstain from voting. As a result, summary 242 may include some or all words or phrases from whitelisted categories and exclude all words and phrases in blacklisted categories.

Summarization engine 204 may produce expansions 238-240 of words 230-232 and phrases 234-236 in the selected categories 224-226. Expansions 238-240 may include additional words and phrases that are semantically similar and/or otherwise related to words 230-232 and phrases 234-236 in categories 224-226. For example, summarization engine 204 may include a "word similarity scanner" that populates expansions 238-240 with additional words and phrases that are semantically similar to predefined words 230-232 and phrases 234-236 in categories 224-226 (e.g., based on cosine similarities between embeddings of words 230-232 and phrases 234-236 and embeddings of the additional words and phrases). In another example, summarization engine 204 may include a "paraphrase scanner" that populates expansions 238-240 with additional words and phrases that are determined by human sources to be paraphrases of predefined words 230-232 and phrases 234-236 in categories 224-226.

After expansions 238-240 are generated by a given scanner, the scanner may match each term and related terms 218 in index 208 to words 230-232, phrases 234-236, and/or expansions 238-240 in categories 224-226. When a match is found, the scanner generates a vote for including the corresponding word, phrase, or expansion in summary 242 (if the scanner is used to apply a whitelist to index 208) or excluding the corresponding word, phrase, or expansion from summary 242 (if the scanner is used to apply a blacklist to index 208).

To match terms 210 and related terms 218 to words 230-232, scanners in summarization engine 204 may iterate through entries in index 208 and compare terms 210 and related terms 218 and in each entry to all words 230-232 and/or single-word expansions 238-240 in categories 224-226. When a term or related term in an entry matches a corresponding word or single-word expansion, the corresponding scanner may update summary 242 accordingly (e.g., by adding the word or expansion to summary 242 or excluding the word or expansion from summary 242).

On the other hand, phrases 234-236 and phrases in expansions 238-240 may contain a series of multiple words. As a result, summarization engine 204 may be unable to generate exact matches of terms 210 and related terms 218 to the phrases when terms 210 and related terms 218 include only single words and/or a subset of all possible phrases in the recording.

To match terms 210 and related terms 218 to phrases in categories 224-226, summarization engine 204 may use index 208 to generate a timeline 228 that includes a temporal representation of terms 210 from index 208. More specifically, summarization engine 204 may divide the recording into contiguous frames of fixed duration. For example, summarization engine 204 may represent the recording as a series of consecutive one-second intervals from the beginning of the recording to the end of the recording. Next, summarization engine 204 may use locations 212 to identify, for each frame in the recording, any terms 210 that occur in or overlap with the frame. For example, summarization engine 204 may determine that a term falls within a frame when the start and/or end times of the term are included in the frame.

Summarization engine 204 may then populate timeline 228 with groupings of locations 212 of terms 210 within the frames. For example, summarization 204 may generate the following representation of timeline 228:

```
{
  "0": {
    "can": {
      "locations": [
        { "start": 0.029, "end": 0.76, "conf": 1, "asr": "B", "contempCount": 3 }
        { "start": 0.031, "end": 0.73, "conf": .9, "asr": "B", "contempCount": 3 }
      ]
    },
    "cannes": {
      "locations": [{"start": 0.02, "end": 0.63, "conf": 0.78, "asr": "B", "contempCount": 5}]
    },
    "canoe": {
      "locations": [{"start": 0, "end": 1.17, "conf": 0.81, "asr": "A", "contempCount": 8}]
    },
    ...
  },
  "1": {
    "you": {
      "locations": [{"start": 0.91, "end": 1.46, "conf": 0.99, "asr": "A", "contempCount": 4}]
    },
    "yeah": {
      "locations": [{"start": 0.89, "end": 1.63, "conf": 0.92, "asr": "B", "contempCount": 6}]
    },
    "canoe": {
      "locations": [{"start": 0, "end": 1.17, "conf": 0.81, "asr": "A", "contempCount": 8}]
    },
    "please": {
      "locations": [{"start": 1.53, "end": 1.96, "conf": 0.97, "asr": "B", "contempCount": 5}]
    },
    "plea": {
      "locations": [{"start": 1.59, "end": 2.03, "conf": 0.72, "asr": "A", "contempCount": 7}]
    },
    ...
  },
  ...
}
```

In the above representation, the first frame has an index of "0" and includes at least three terms 210 of "can," "cannes," and "canoe." The second frame has an index of "1" and includes at least five terms of "you," "yeah," "canoe," "please," and "plea. Each term has a "start" and "end" timestamp, one or both of which overlap with the time interval represented by the corresponding frame (i.e., the first or second one-second interval of the recording). Each term also has a "conf" field representing a confidence score for the term, which may range from 0 to 1. The confidence score may indicate or reflect the probability that the corresponding term is found at the specified frame. Each term further includes an "asr" field identifying the ASR engine used to predict the term, along with a "contempCount" field specifying the number of contemporary words found in the range of the term's start and end timestamps.

After frames in timeline 228 are populated with all locations 212 of terms 210 in index 208, summarization engine 204 may use timeline 228 to match terms 210 in index 208 to predefined phrases 234-236 and/or phrases in expansions 238-240 from the selected categories 224-226. For example, a scanner invoked or executed by summarization engine 204 may attempt to locate a phrase in timeline 228 by identifying the first frame in timeline 228 that includes the first word in the phrase (e.g., by iterating through entries in timeline 228 until a frame including the first word is found). Next, the scanner may search for the second word in the phrase in a pre-specified number of frames immediately following the first frame (e.g., 3-5 frames). The pre-specified number of frames may be configured or adjusted based on the language(s) spoken in the recording, user preferences, the length of the first word, and/or previous performance of summarization engine 204 in identifying phrases in other recordings.

If the second word is found within the pre-specified number of frames after the first frame, the scanner may repeat the process with subsequent words in the phrase and additional frames following a frame including a given word in the phrase. When all consecutive words in the phrase are found within the pre-specified number of frames of one another (without finding other words in between any two consecutive words of the phrase), the scanner may determine that the recording includes the phrase. In turn, the scanner and/or summarization engine 204 may include the phrase in summary 242 and set the location of the phrase to include the range of frames spanned by the phrase and/or the start timestamp of the first word in the phrase and the end timestamp of the last word in the phrase.

If the second word cannot be found and/or a different word from the second word is found within the pre-specified number of frames after the first frame, the scanner may attempt to find the phrase in a different part of the recording. In particular, the scanner may identify the next frame in timeline 228 that includes the first word and attempt to locate the second word within the pre-specified number of frames after the next frame including the first word. The scanner may thus continue searching timeline 228 for one or more occurrences of the phrase until the end of timeline 228 is reached. The scanner may then repeat the process for other phrases 234-236 and/or phrases in expansion 238-240 in categories 224-226 until timeline 228 has been searched for all phrases in categories 224-226. To reduce computational overhead associated with repeatedly searching index 208 and timeline 228 for a large number of words and phrases, instances of summarization engine 204 and/or the scanners may operate in parallel to identify different categories 224-226 of words 230-232, phrases 234-236, and/or expansions 238-240 in the recording at the same time; identify words in index 208 and phrases in timeline 228 at the same time; and/or otherwise expedite the creation of summary 242 from index 208 and timeline 228.

Summarization engine 204 and/or another component may additionally generate insights 224 related to summary 242 and/or the recording. For example, the component may apply natural language processing, topic mining, sentiment analysis, named entity recognition, and/or other types of text-analysis techniques to index 208, timeline 228, and/or summary 242 to assess the inquisitiveness, quantitativeness, contentiousness, sentiment, and/or level of action orientation in the recording and/or identify topics, themes, and/or entities in the recording.

Finally, summary 242 and insights 244 may be displayed within user interface 206, which may be provided by interactive virtual meeting assistant 132 and/or separately from interactive virtual meeting assistant 132. For example, summary 242 may include words and phrases found in the recording, which are grouped or listed under the highest precedence categories 224-226 under which the words and phrases are found. Summary 242 may also, or instead, include a temporal representation of the words and phrases in the recording (e.g., locations of the words and phrases in a "timeline" of the recording) and/or portions of the recording including the words and phrases (e.g., for playback by a user interacting with the user interface). Insights 244 may include visualizations indicating levels of inquisitiveness, quantitativeness, contentiousness, and/or action orientation in the recording; a "word cloud" of topics, themes, and/or entities in the recording; and/or a representation of sentiment in the recording.

A user may interact with user interface 206 to explore different portions of summary 242 and insights 244 for a given recording. The user may also, or instead, use different sets of customizations 246 to generate multiple summaries and sets of insights from the same recording. User interfaces for generating and interacting with meeting summaries and insights are discussed in further detail below with respect to FIGS. 3A-3C.

Figure 3A:
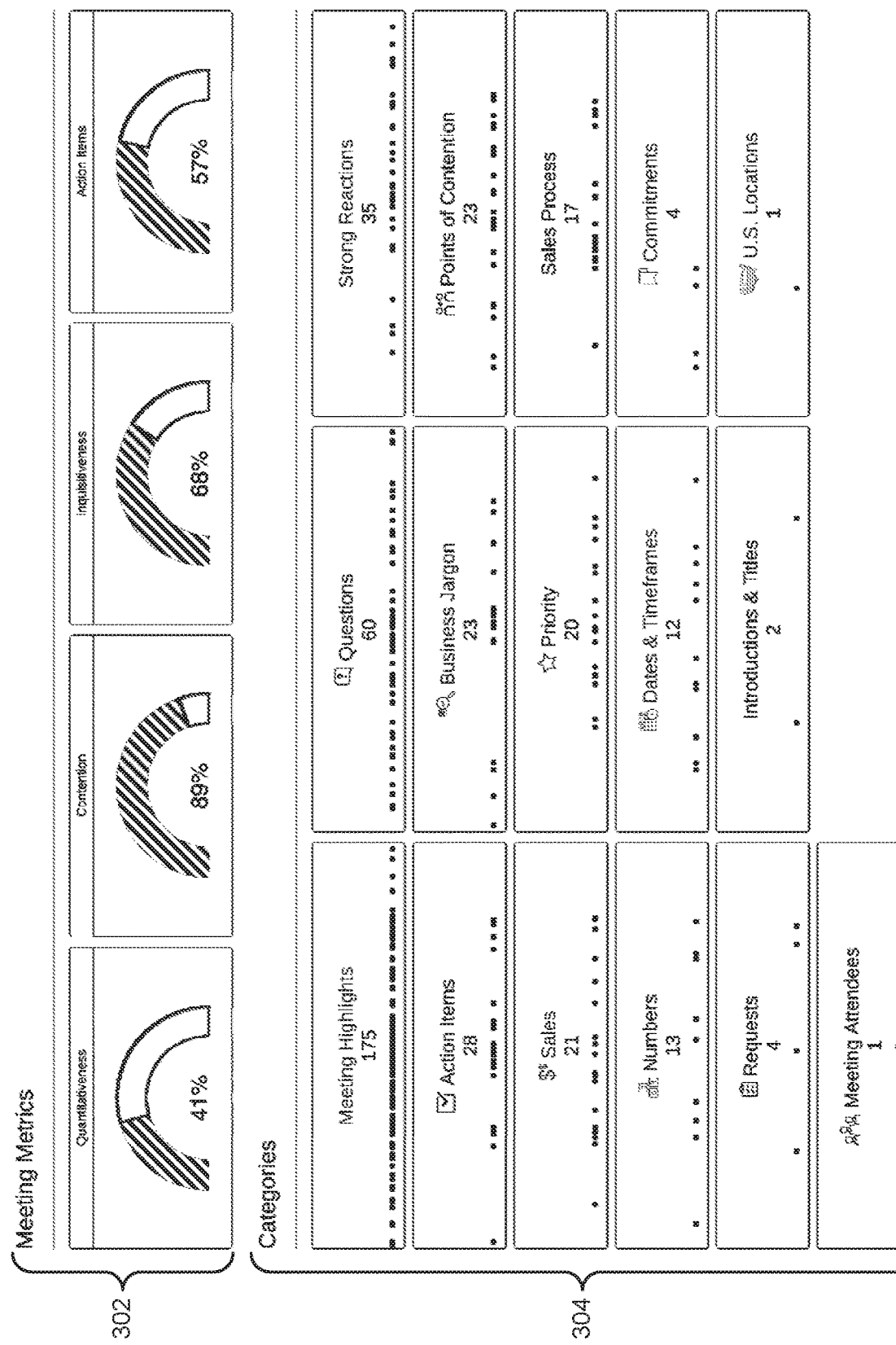
FIGS. 3A-3C collectively illustrate an example user interface associated with the virtual meeting assistant, according to various embodiments of the present invention.
Figure 3B:
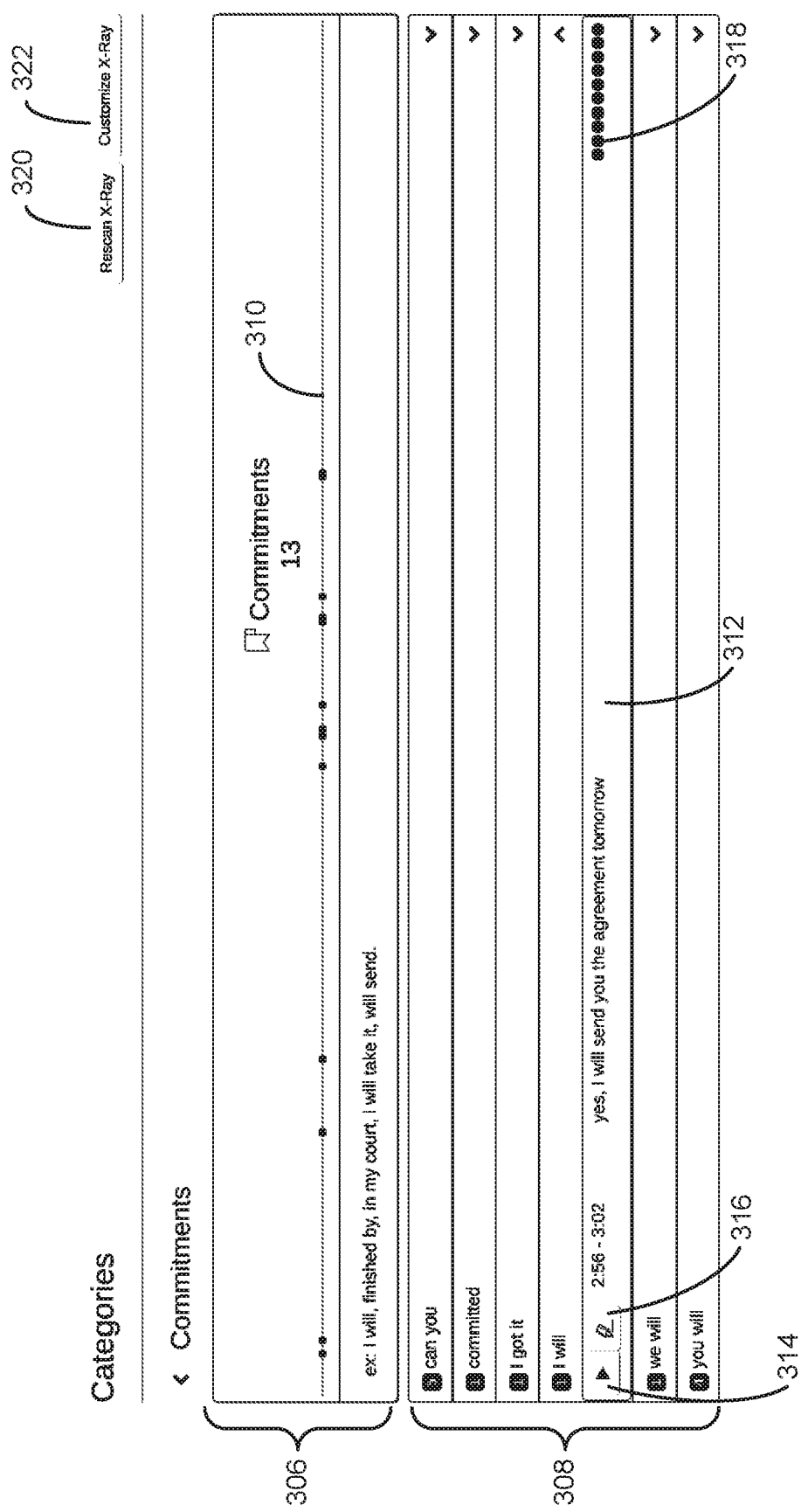
Figure 3C:
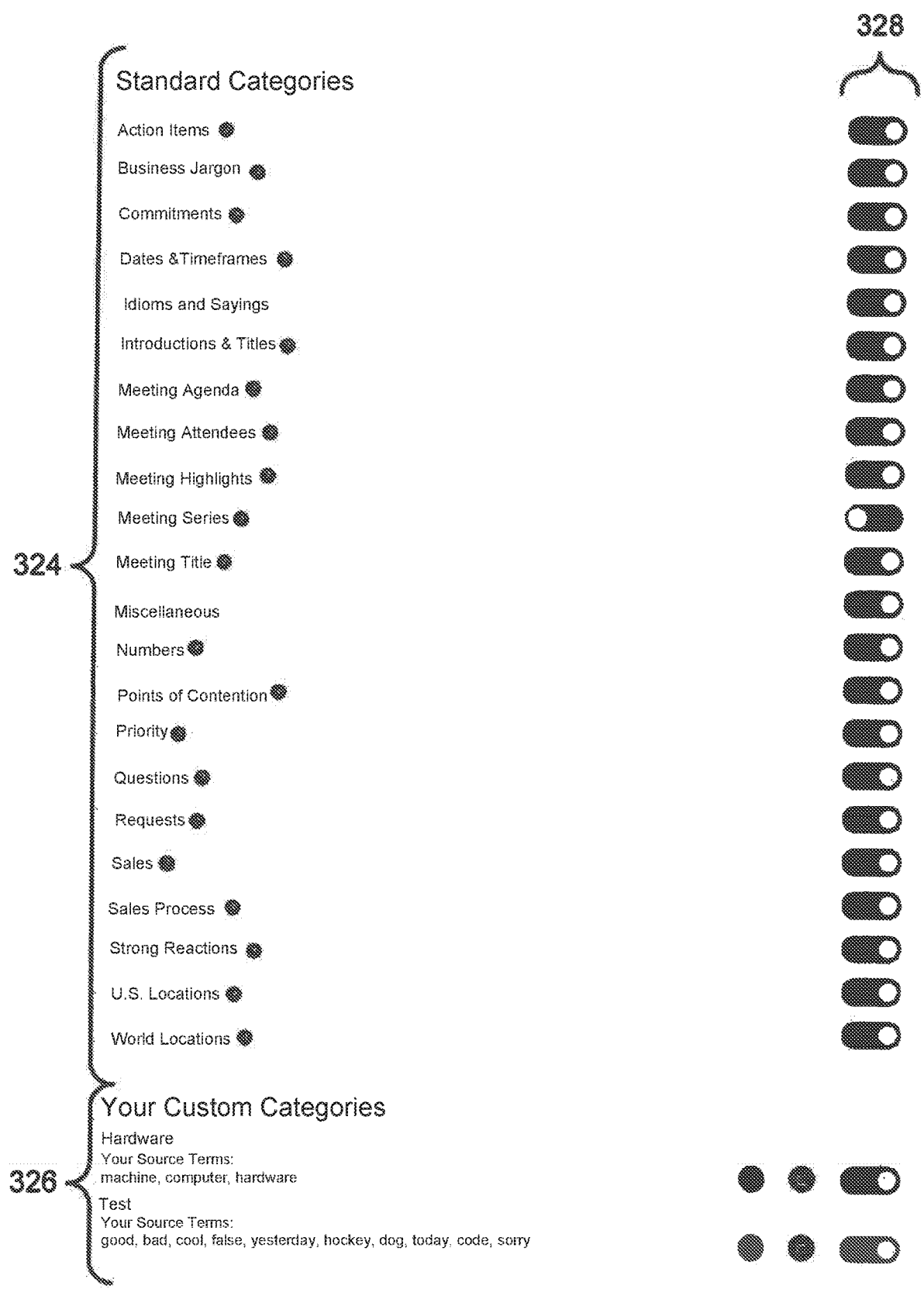

FIGS. 3A-3C collectively illustrate an example user interface 206 associated with the virtual meeting assistant of FIG. 1, according to various embodiments of the present invention. As shown in FIG. 3A, a screen in the example user interface 206 includes a first portion 302 representing "Meeting Metrics" and a second portion 304 representing "Categories" for a given recording.

Portion 302 includes graphical representations of insights 244 related to measurable attributes of the recording. In particular, portion 302 may include gauge charts that depict attributes such as "Quantitativeness," "Contention," "Inquisitiveness," and "Action Items." A user may click on each gauge chart to view additional information related to the corresponding attribute, such as portions of the recording that contribute to the attribute and/or detract from the attribute.

Portion 304 includes graphical representations of categories 224-226 of words and phrases found in the recording. Such categories may include, but are not limited to, "Meeting Highlights," "Questions," "Strong Reactions," "Action Items," "Business Jargon," "Points of Contention," "Sales," "Priority," "Sales Process," "Numbers," "Dates & Timeframes," "Commitments," "Requests," "Introductions & Titles," "U.S. Locations," and "Meeting Attendees." Each category may also include a series of points along a timeline that represent locations in the recording of words and phrases in the category. The user may click on a category to view additional information related to the category.

As shown in FIG. 3B, user interface 206 includes a graphical representation of additional information related to the "Commitments" category. The screen of FIG. 3B may be shown after the user clicks on the "Commitments" category within the user interface of FIG. 3A, searches for the category, and/or otherwise navigates to the screen from another portion of user interface 206.

The screen of FIG. 3B includes a first portion 306 representing an overview of the "Commitments" category with respect to the recording. The overview includes a timeline 310 of the recording, with points along the timeline representing the locations in the recording of words and phrases in the category. The overview also provides examples of words and phrases in the category that are found in the recording (i.e. "ex: I will, finished by, in my court, I will take it, will send.").

A second portion 308 of the screen includes a list of words and phrases in the recording that belong to the category. The user may click on a word or phrase in the list to view instances of the word or phrase in the recording. In particular, portion 308 includes a module 312 representing an instance of the "I will" phrase. Module 312 includes a range of time ("2:56-3:02") spanned by a sentence that includes the phrase ("yes, I will send you the agreement tomorrow"). Module 312 also includes a number of other user-interface elements, such as a button 314 that allows the user to play the portion of the recording including the sentence, another button 316 that allows the user to modify the sentence, and/or a rating 318 representing the level of confidence in the prediction of the phrase and/or sentence.

The upper right corner of the screen includes two additional buttons 320-322 for accessing other portions of user interface 206. The user may click button 320 ("Rescan X-Ray") to navigate to a screen of user interface 206 for producing a new summary and/or set of insights from the same recording. The user may click button 322 ("Customize X-Ray") to navigate to a screen of user interface 206 for customizing the generation of the summary and/or insights from the recording.

As shown in FIG. 3C, another screen of user interface 206 includes a graphical representation of customizations that can be applied to categories used in generating the summary and/or insights. A first portion 324 of user interface 206 lists a number of "Standard Categories" of words and phrases that can be identified in the recording. "Standard Categories" may include curated categories that are created by a product team and/or dynamic categories that are created from metadata for the meeting. The curated categories may include, but are not limited to, "Action Items," "Business Jargon," "Commitments, "Dates & Timeframes," "Idioms and Sayings," "Introductions & Titles," "Miscellaneous," "Numbers," "Points of Contention," "Priority," "Questions," "Requests," "Sales," "Sales Process," "Strong Reactions, "U.S. Locations," and "World Locations." The dynamic categories may include, but are not limited to, "Meeting Agenda," "Meeting Attendees," "Meeting Highlights," "Meeting Series," and "Meeting Title."

A second portion 326 of user interface 206 includes a number of "Your Custom Categories" of words and phrases that can be identified in the recording. Categories included in portion 326 may be user-defined categories ("Hardware" and "Test") that are created and/or added by a user involved in generating the summary and/or insights from the recording. The user may click on buttons to the right of the custom categories to edit the custom categories, add or remove words and phrases under the custom categories, change the order of precedence associated with the custom categories and/or other categories, and/or delete the custom categories.

The user may further interact with a column 328 of switches to include some or all categories in portions 324-326 in the summary or exclude some or all categories in portions 324-326 from summary. As shown, switches in column 328 indicate that the "Meeting Series" category is excluded from the summary, while all other listed categories are included in the summary.

Figure 4:
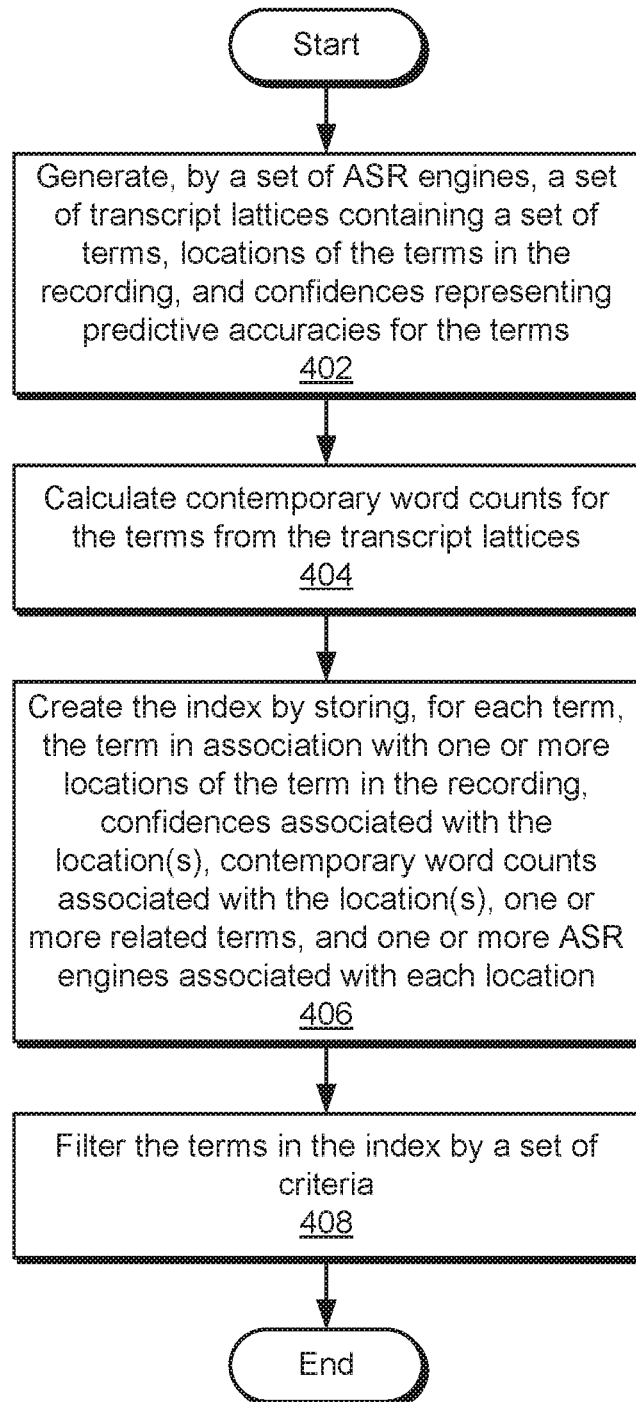
FIG. 4 is a flow diagram of method steps for generating an index associated with a recording, according to various embodiments of the present invention.

FIG. 4 is a flow diagram of method steps for generating an index associated with a recording, according to various embodiments of the present invention. Although the method steps are described in conjunction with the systems of FIGS. 1-2, persons skilled in the art will understand that any system configured to perform the method steps, in any order, is within the scope of the present invention.

As shown, indexing engine 202 initially generates 402, by a set of ASR engines, a set of transcript lattices including a set of terms, locations of the terms in the recording, and confidences representing predictive accuracies for the terms. For example, each transcript lattice may be produced by a different ASR engine from a recording and/or transcript of a meeting or other event. Entries or lines in the transcript lattice may include a start timestamp, an end timestamp or duration, a word spanning the start and end timestamps (or the duration after the start timestamp), and a confidence score for the word that ranges from 0 to 1.

Next, indexing engine 202 calculates 404 contemporary word counts for the terms from the transcript lattices. For example, indexing engine 202 may calculate a contemporary word count for a given word as the number of words that co-occur in the time interval spanned by the word.

Indexing engine 202 then creates 406 the index by storing, for each term, the term in association with one or more locations of the term in the recording, confidences associated with the location(s), contemporary word counts associated with the location(s), one or more ASR engines associated with each location, one or more related terms, and one or more ASR engines used to produce the term. For example, indexing engine 202 may include an entry for each unique term in the index. The entry may specify the term and any related terms, followed by a list of the term's locations. Each location may be stored in association with a start and end timestamp (or start timestamp and duration) for the term in the recording, a confidence in the given location, a contemporary word count at the location, and one or more ASR engines that predicted the term at the location.

Finally, indexing engine 202 filters 408 the terms in the index by a set of criteria. For example, indexing engine 202 may apply a maximum contemporary word count, a confidence threshold, a minimum number of ASR engines used to generate each term, a stop word list, a blacklist, and/or a parts of speech (POS) tag filter to the index to improve the quality of the terms in the index and/or the relevance of the terms to subsequent applications involving the index (e.g., generating a summary and/or insights from the index).

Figure 5:
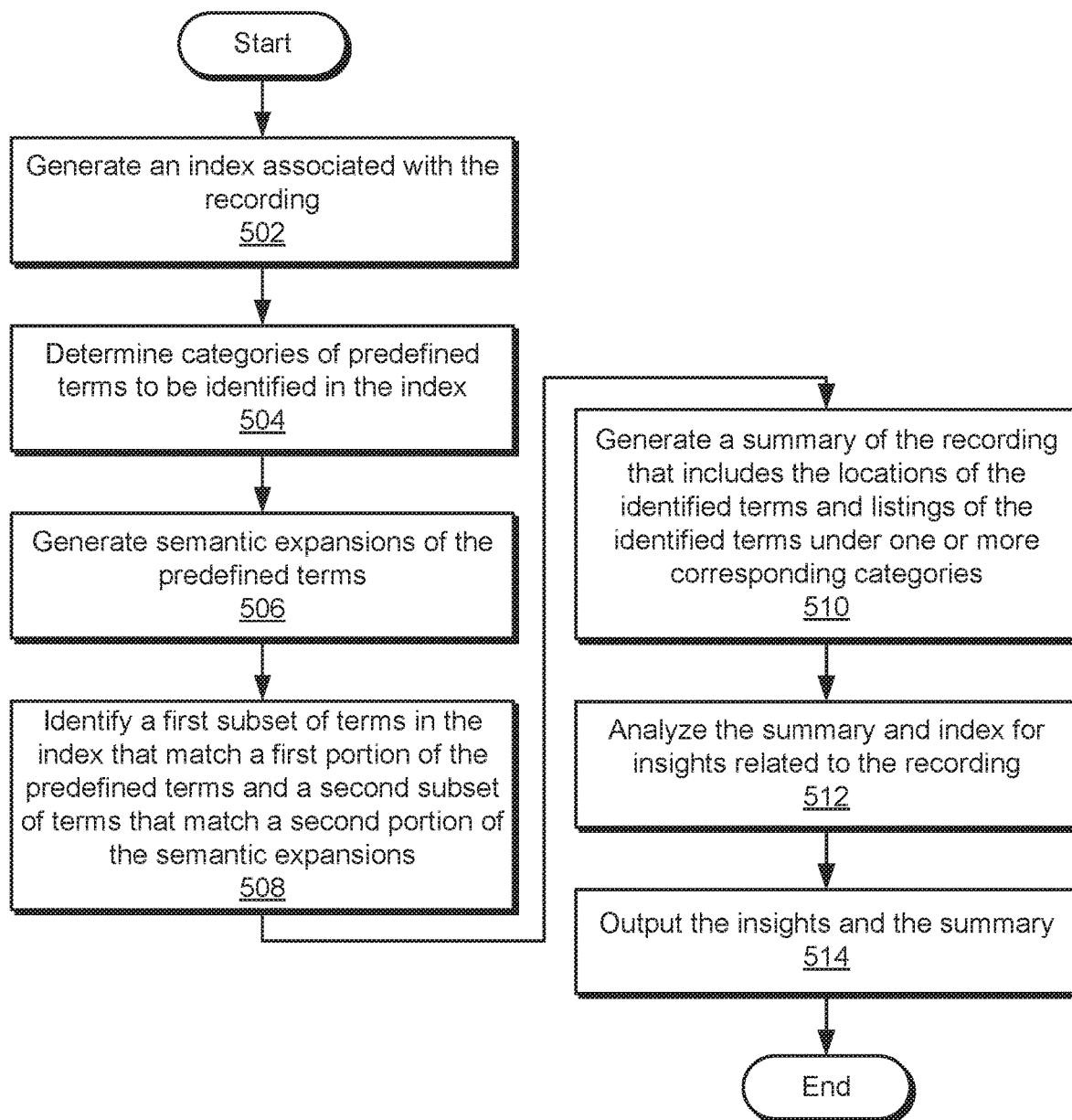
FIG. 5 is a flow diagram of method steps for generating a summary of a recording, according to various embodiments of the present invention.

FIG. 5 is a flow diagram of method steps for generating a summary of a recording, according to various embodiments of the present invention. Although the method steps are described in conjunction with the systems of FIGS. 1-2, persons skilled in the art will understand that any system configured to perform the method steps, in any order, is within the scope of the present invention.

As shown, summarization engine 204 generates 502 an index associated with the recording, as previously discussed with respect to FIG. 4. Next, summarization engine 204 determines 504 categories of predefined terms to be identified in the index. For example, summarization engine 204 may obtain default selections and/or user selections of categories from curated categories, dynamic categories, and user-defined categories.

Summarization engine 204 also generates 506 semantic expansions of the predefined terms. For example, summarization engine 204 may expand the predefined terms into additional words and phrases that are user-defined paraphrases of the predefined terms and/or additional words and phrases that are within a semantic distance from the predefined terms.

Summarization engine 204 then identifies 508 a first subset of terms in the index that match a first portion of the predefined terms and a second subset of terms in the index that match a second portion of the semantic expansions. For example, summarization engine 204 may attempt to locate, in the index, each word belonging to a category identified in operation 504. Summarization engine 204 may also use a timeline of the terms in the recording to locate, in the index, phrases belonging to categories identified in operation 504, as described in further detail below with respect to FIG. 6.

After predefined and/or semantically expanded terms in the categories are identified in the index, summarization engine 204 generates 510 a summary of the recording that includes the locations of the identified terms and listings of the identified terms under one or more corresponding categories. For example, summarization engine 204 may list the identified terms under the categories within the summary and include time intervals spanned by each instance of a term in the summary.

Finally, summarization engine 204 analyzes 512 the summary and index for insights related to the recording and outputs 514 the insights and the summary. For example, summarization engine 204 may display timelines, charts, visualizations, and/or other graphical representations of the summary and insights in a user interface, such as user interface 206 of FIG. 2. A user may interact with the displayed summary and insights to assess the content, gist, tone, effectiveness, level of participation, and/or other characteristics of the event without manually reviewing the recording and/or transcript of the event and/or taking notes from the recording, transcript, and/or the event.

Figure 6:
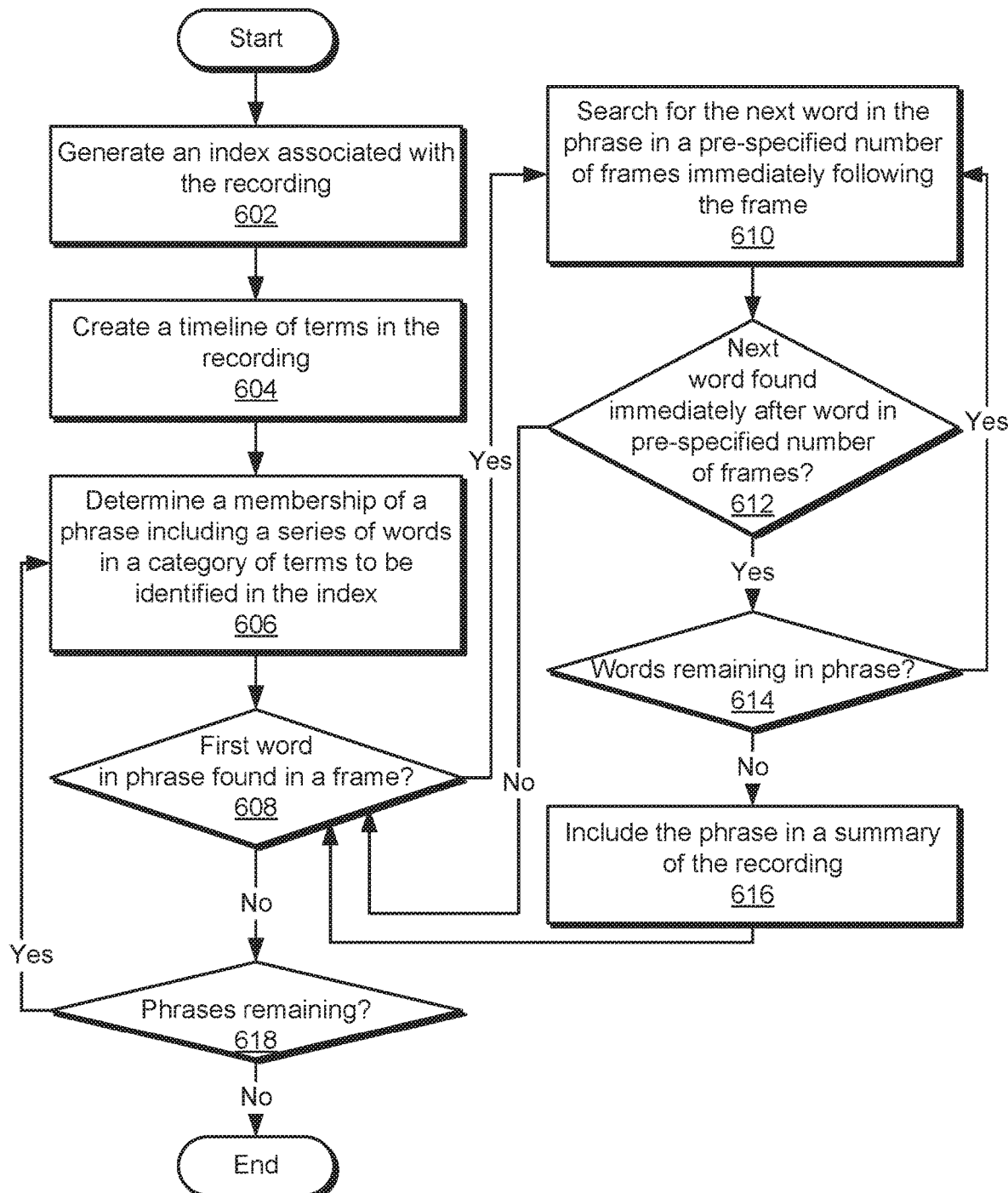
FIG. 6 is a flow diagram of method steps for generating a summary of a recording, according to various embodiments of the present invention.

FIG. 6 is a flow diagram of method steps for generating a summary of a recording, according to various embodiments of the present invention. Although the method steps are described in conjunction with the systems of FIGS. 1-2, persons skilled in the art will understand that any system configured to perform the method steps, in any order, is within the scope of the present invention.

As shown, summarization engine 204 generates 602 an index associated with the recording, as previously discussed with respect to FIG. 4. Next, summarization engine 204 creates 604, based on the index, a timeline of the terms in the recording. The timeline may identify contiguous frames in the recording and groupings of locations of the terms within the contiguous frames in the recording. To create the timeline, summarization engine 204 may match a frame in the contiguous frames to locations of one or more terms in the index and include, in an entry for the frame in the timeline, one or more entries for the term(s). If the frame does not include any terms in the index, summarization engine 204 may omit creating an entry for the frame in the timeline.

Summarization engine 204 also determines 606 a membership of a phrase including a series of words in a category of terms to be identified in the index. For example, summarization engine 204 may obtain a set of categories selected for use in generating the summary of the recording. Summarization engine 204 may then obtain the phrase as a predefined term from the category and/or semantically expand a predefined term from the category into the phrase.

Summarization engine 204 then attempts to identify a subset of contiguous frames in the timeline that include the phrase. First, summarization engine 204 determines if a first word in the phrase can be found within a frame of the timeline 608. For example, summarization engine 204 may iterate through entries in the timeline until a frame including the word is found or the end of the timeline is reached.

Next, summarization engine 204 searches 610 for a next word that immediately follows the word in a pre-specified number of frames immediately following the frame. For example, summarization engine 204 may iterate through entries for the pre-specified number of frames to attempt to find the next word. If the next word is found 612 immediately after the word in the pre-specified number of frames, summarization engine 204 repeats the search 610 for remaining words in the phrase 614. If all consecutive words in the phrase can be found immediately after one another and within a pre-specified number of frames of one another, the phrase is included 616 in a summary of the recording.

If any word in the phrase cannot be found within the pre-specified number of frames following a previous word in the phrase or if a different word is found in the pre-specified number of frames following the previous word, summarization engine 204 attempts to locate the first word in the phrase in a subsequent frame 608 of the timeline. Summarization engine 204 may then repeat the process of locating subsequent words in the phrase in subsequent frames of the timeline 610-614 until the entire phrase is found at a given location, a different series of words that includes the first word in the phrase is found at the location, or the end of the timeline is reached. When the entire phrase is found at a given location represented by a series of contiguous frames in the timeline, summarization engine 204 includes 616 the phrase and/or the phrase's location to the summary.

Once the end of the timeline is reached, summarization engine 204 may search 616 the timeline for remaining phrases that are used to generate the summary. In particular, summarization engine 204 may determine 606 membership of another phrase in a category of terms to be identified in the index and attempt to locate a series of contiguous frames that include the corresponding series of words in the phrase 608-614. When the phrase is found in a given series of contiguous frames, summarization engine 204 includes 616 the phrase in the summary. Summarization engine 204 may thus identify all locations in the timeline that contain phrases related to the categories and include the phrases and locations in the summary.

In sum, the disclosed techniques can be used to generate a concise summary and insights related to a recording of a meeting or other event. To generate the summary, an inverted index associated with the recording is created from transcript lattices. The inverted index is then searched for words that match the predefined terms and/or semantic expansions of the predefined terms that belong to a number of selected or enabled categories. A timeline of the terms is also created using the index and used to match contiguous sequences of words in the recording to phrases in the predefined or semantically expanded terms. Predefined or semantically expanded words and phrases that are found in the index are then listed under the relevant categories within a summary of the recording, and insights related to the recording are generated and outputted with the summary.

In turn, the disclosed techniques may improve the management and/or review of meetings or other events and/or the use of content discussed during the events. For example, a user may analyze the summary of a meeting and/or insights related to the meeting to identify key points, topics, decisions, and/or participants in the meeting; determine the effectiveness of the meeting in covering the agenda and/or the ability of the participants to collaborate during the meeting; and/or identify actions that can be taken as result of the meeting. The user may also, or instead, customize the generation of the summary and/or insights from a recording of the meeting to tailor the summary and/or insights to the user's needs. Consequently, the disclosed techniques provide technological improvements in interactive virtual meeting assistant 132 and/or other applications or devices that are used to conduct, manage, schedule, and/or review meetings or other types of events.

1. A method for generating a summary of a recording, comprising generating an index associated with the recording, wherein the index identifies a set of terms included in the recording and, for each term in the set of terms, a corresponding location of the term in the recording, creating, based on the index, a timeline of the set of terms in the recording, wherein the timeline identifies contiguous frames in the recording and groupings of locations of the set of terms within the contiguous frames in the recording, identifying a subset of the contiguous frames in the timeline that include a phrase comprising a series of words, and generating a summary of the recording that includes the phrase.

2. The method of clause 1, wherein generating the index comprises generating, by a set of automatic speech recognition (ASR) engines, a set of transcript lattices comprising the set of terms, locations of the set of terms in the recording, and confidences representing predictive accuracies for the set of terms, calculating contemporary word counts for the set of terms from the set of transcript lattices, and creating the index by storing, for each term in the set of terms, the term in association with one or more locations of the term in the recording, one or more confidences associated with the one or more locations of the term, and one or more contemporary word counts associated with the one or more locations of the term.

3. The method of clause 1 or 2, wherein generating the index further comprises, for each term in the set of terms, storing the term in association with one or more related terms and one or more ASR engines used to produce the term.

4. The method of any of clauses 1-3, wherein generating the index further comprises filtering the set of terms in the index by a set of criteria.

5. The method of any of clauses 1-4, wherein the set of criteria comprises at least one of a maximum contemporary word count, a confidence threshold, a minimum number of ASR engines used to generate each term, a stop word list, a blacklist, and a part-of-speech (POS) tag.

6. The method of any of clauses 1-5, wherein creating, from the index, the timeline of the set of terms comprises matching a frame in the contiguous frames to one or more locations of one or more terms in the index, and including, in an entry for the frame in the timeline, one or more entries for the one or more terms.

7. The method of any of clauses 1-6, further comprising determining a membership of the phrase in a category of terms to be identified in the index prior to identifying the subset of the contiguous frames in the timeline that include the phrase.

8. The method of any of clauses 1-7, wherein determining the membership of the phrase in the category comprises at least one of obtaining the phrase as a first predefined term from the category, and semantically expanding a second predefined term from the category into the phrase.

9. The method of any of clauses 1-8, wherein identifying the subset of the contiguous frames in the timeline that include the phrase comprises determining a first location of a first word in the phrase within a first frame of the timeline, and searching for a second word in the phrase that immediately follows the first word in a pre-specified number of frames immediately following the first frame.

10. The method of any of clauses 1-9, wherein identifying the subset of the contiguous frames in the timeline that include the phrase further comprises, when the second word is not found in the pre-specified number of frames immediately following the first frame, determining a second location of the first word within a second frame of the timeline that is later than the first frame, and searching for the second word in a pre-specified number of frames immediately following the second frame.

11. The method of any of clauses 1-10, wherein identifying the subset of the contiguous frames in the timeline that include the phrase further comprises, when a word that is not the second word is found in the pre-specified number of frames immediately following the first frame, determining a second location of the first word within a second frame of the timeline that is later than the first frame, and searching for the second word in a pre-specified number of frames immediately following the second frame.

12. The method of any of clauses 1-11, wherein the contiguous frames comprise one-second intervals in the recording.

13. A non-transitory computer readable medium storing instructions that, when executed by a processor, cause the processor to perform the steps of generating an index associated with the recording, wherein the index identifies a set of terms included in the recording and, for each term in the set of terms, a corresponding location of the term in the recording, determining categories of predefined terms to be identified in the index, identifying a first subset of the terms in the index that match a first portion of the predefined terms in the categories, and outputting a summary of the recording comprising the locations of the first subset of terms in the recording and listings of the first subset of terms under one or more corresponding categories.

14. The non-transitory computer readable medium of clause 13, wherein the steps further comprise determining a membership of the phrase in a category of terms to be identified in the index prior to identifying the subset of the contiguous frames in the timeline that include the phrase.

15. The non-transitory computer readable medium of clause 13 or 14, wherein determining the membership of the phrase in the category comprises at least one of obtaining the phrase as a first predefined term from the category, and semantically expanding a second predefined term from the category into the phrase.

16. The non-transitory computer readable medium of any of clauses 13-15, wherein identifying the subset of the contiguous frames in the timeline that include the phrase comprises determining a first location of a first word in the phrase within a first frame of the timeline, and searching for a second word in the phrase that immediately follows the first word in a pre-specified number of frames immediately following the first frame.

17. The non-transitory computer readable medium of any of clauses 13-16, wherein identifying the subset of the contiguous frames in the timeline that include the phrase further comprises, when the second word is not found in the pre-specified number of frames immediately following the first frame, determining a second location of the first word within a second frame of the timeline that is later than the first frame, and searching for the second word in a pre-specified number of frames immediately following the second frame.

18. The non-transitory computer readable medium of any of clauses 13-17, wherein identifying the subset of the contiguous frames in the timeline that include the phrase further comprises, when a word that is not the second word is found in the pre-specified number of frames immediately following the first frame, determining a second location of the first word within a second frame of the timeline that is later than the first frame, and searching for the second word in a pre-specified number of frames immediately following the second frame.

19. The non-transitory computer readable medium of any of clauses 13-18, wherein the contiguous frames comprise one-second intervals in the recording.

20. A system, comprising a memory that stores instructions, and a processor that is coupled to the memory and, when executing the instructions, is configured to generate an index associated with the recording, wherein the index identifies a set of terms included in the recording and, for each term in the set of terms, a corresponding location of the term in the recording, create, based on the index, a timeline of the set of terms in the recording, wherein the timeline identifies contiguous frames in the recording and groupings of locations of the set of terms within the contiguous frames in the recording, identify a subset of the contiguous frames in the timeline that include a phrase comprising a series of words, and generate a summary of the recording that includes the phrase.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for generating a summary of a recording, comprising:
    generating an index associated with the recording, wherein the index identifies a set of terms included in the recording and, for each term in the set of terms, a corresponding location of the term in the recording;
    creating, based on the index, a timeline of the set of terms in the recording, wherein the timeline identifies contiguous frames in the recording and groupings of locations of the set of terms within the contiguous frames in the recording;
    identifying a subset of the contiguous frames in the timeline that include a phrase comprising a series of words wherein identifying the subset of the contiguous frames in the timeline that include the phrase comprises;
        determining a first location of a first word in the phrase within a first frame of the timeline,
        searching for a second word in the phrase that immediately follows the first word in a pre-specified number of frames immediately following the first frame,
        when the second word is not found in the pre-specified number of frames immediately following the first frame, determining a second location of the first word within a second frame of the timeline that is later than the first frame, and
        searching for the second word in a pre-specified number of frames immediately following the second frame; and
    generating a summary of the recording that includes the phrase.

2. The method of claim 1, wherein generating the index comprises:
    generating, by a set of automatic speech recognition (ASR) engines, a set of transcript lattices comprising the set of terms, locations of the set of terms in the recording, and confidences representing predictive accuracies for the set of terms;
    calculating contemporary word counts for the set of terms from the set of transcript lattices; and
    creating the index by storing, for each term in the set of terms, the term in association with one or more locations of the term in the recording, one or more confidences associated with the one or more locations of the term, and one or more contemporary word counts associated with the one or more locations of the term.

3. The method of claim 2, wherein generating the index further comprises: for each term in the set of terms, storing the term in association with one or more related terms and one or more ASR engines used to produce the term.

4. The method of claim 3, wherein generating the index further comprises: filtering the set of terms in the index by a set of criteria.

5. The method of claim 4, wherein the set of criteria comprises at least one of a maximum contemporary word count, a confidence threshold, a minimum number of ASR engines used to generate each term, a stop word list, a blacklist, and a part-of-speech (POS) tag.

6. The method of claim 1, wherein creating, from the index, the timeline of the set of terms comprises:
    matching a frame in the contiguous frames to one or more locations of one or more terms in the index; and
    including, in an entry for the frame in the timeline, one or more entries for the one or more terms.

7. The method of claim 1, further comprising:
determining a membership of the phrase in a category of terms to be identified in the index prior to identifying the subset of the contiguous frames in the timeline that include the phrase.

8. The method of claim 7, wherein determining the membership of the phrase in the category comprises at least one of:
obtaining the phrase as a first predefined term from the category; and
semantically expanding a second predefined term from the category into the phrase.

9. The method of claim 1, wherein the contiguous frames comprise one-second intervals in the recording.

10. A non-transitory computer readable medium storing instructions that, when executed by a processor, cause the processor to perform the steps of:
generating an index associated with the recording, wherein the index identifies a set of terms included in the recording and, for each term in the set of terms, a corresponding location of the term in the recording;
creating, based on the index, a timeline of the set of terms in the recording, wherein the timeline identifies contiguous frames in the recording and groupings of locations of the set of terms within the contiguous frames in the recording;
identifying a subset of the contiguous frames in the timeline that include a phrase comprising a series of words wherein identifying the subset of the contiguous frames in the timeline that include the phrase comprises;
determining a first location of a first word in the phrase within a first frame of the timeline,
searching for a second word in the phrase that immediately follows the first word in a pre-specified number of frames immediately following the first frame,
when a word that is not the second word is found in the pre-specified number of frames immediately following the first frame, determining a second location of the first word within a second frame of the timeline that is later than the first frame, and
searching for the second word in a pre-specified number of frames immediately following the second frame; and
generating a summary of the recording that includes the phrase.

11. The non-transitory computer readable medium of claim 10, wherein the steps further comprise:
determining a membership of the phrase in a category of terms to be identified in the index prior to identifying the subset of the contiguous frames in the timeline that include the phrase.

12. The non-transitory computer readable medium of claim 11, wherein determining the membership of the phrase in the category comprises at least one of:
obtaining the phrase as a first predefined term from the category; and
semantically expanding a second predefined term from the category into the phrase.

13. The non-transitory computer readable medium of claim 10, wherein the contiguous frames comprise one-second intervals in the recording.

14. A system, comprising:
a memory that stores instructions, and
a processor that is coupled to the memory and, when executing the instructions, is configured to:
generate an index associated with the recording, wherein the index identifies a set of terms included in the recording and, for each term in the set of terms, a corresponding location of the term in the recording;
create, based on the index, a timeline of the set of terms in the recording, wherein the timeline identifies contiguous frames in the recording and groupings of locations of the set of terms within the contiguous frames in the recording;
identify a subset of the contiguous frames in the timeline that include a phrase comprising a series of words wherein the processor configured to identify the subset of the contiguous frames in the timeline that include the phrase comprises the processor being configured to,
determine a first location of a first word in the phrase within a first frame of the timeline,
search for a second word in the phrase that immediately follows the first word in a pre-specified number of frames immediately following the first frame,
when the second word is not found in the pre-specified number of frames immediately following the first frame, determine a second location of the first word within a second frame of the timeline that is later than the first frame, and
search for the second word in a pre-specified number of frames immediately following the second frame; and
generate a summary of the recording that includes the phrase.

* * * * *